US012180776B2

(12) United States Patent
Perkins et al.

(10) Patent No.: US 12,180,776 B2
(45) Date of Patent: Dec. 31, 2024

(54) MULLING SYSTEM FOR PLURAL FENESTRATION ASSEMBLIES WITH MATCHING THERMALLY BROKEN JOINING PLATES THAT HAVE ROTATED AND ENGAGED ARRANGEMENT ACROSS MULLING AXIS

(71) Applicant: JELD-WEN, Inc., Charlotte, NC (US)

(72) Inventors: Philip Steven Perkins, Klamath Falls, OR (US); Jacob Peter Nelson, Klamath Falls, OR (US); Jerry Dean Jones, Klamath Falls, OR (US)

(73) Assignee: JELD-WEN, Inc., Charlotte, NC (US)

( * ) Notice: Subject to any disclaimer, the term of this patent is extended or adjusted under 35 U.S.C. 154(b) by 115 days.

(21) Appl. No.: 17/930,110

(22) Filed: Sep. 7, 2022

(65) Prior Publication Data

US 2024/0076929 A1 Mar. 7, 2024

(51) Int. Cl.

*E06B 1/60* (2006.01)
*E06B 1/36* (2006.01)

(52) U.S. Cl.

CPC ............ *E06B 1/366* (2013.01); *E06B 1/6007* (2013.01)

(58) Field of Classification Search

CPC ........ E06B 1/366; E06B 1/6007; E06B 1/524; E06B 3/26301; E06B 3/26303; E06B 3/26392; E06B 3/964; E06B 3/9643; E06B 3/365

See application file for complete search history.

(56) References Cited

U.S. PATENT DOCUMENTS 119,722 A 10/1871 Bhodes
5,355,645 A * 10/1994 Farag .................... E06B 3/5427 52/235
5,469,683 A * 11/1995 McKenna ............... E06B 3/273 52/844
5,910,086 A 6/1999 Fisher (Continued)

FOREIGN PATENT DOCUMENTS

DE 102008029935 B3 12/2009
GB 1567161 A 5/1980

OTHER PUBLICATIONS marvin.com. General Mulling Information. [Retrieved on Sep. 9, 2022]. Retrieved from Internet: <URL: https://www3.marvin.com/WebDoc/ADM%20Ultimate%20Mulls.pdf.>.

*Primary Examiner* — Kyle J. Walraed-Sullivan
(74) *Attorney, Agent, or Firm* — Lorenz & Kopf, LLP

(57) ABSTRACT

A mulling system includes a first joining plate with a first plate member, a second plate member, and a first thermal breaker that extend longitudinally along a mulling axis with the first thermal breaker attaching the first and second plate members. The mulling system includes a second joining plate that includes a third plate member, a fourth plate member, and a second thermal breaker that extend longitudinally along the mulling axis with the second thermal breaker attaching the third and fourth plate members. The second joining plate attaches to the first joining plate to join together first and second fenestration units with the mulling axis extending between the first and second joining plates. The first joining plate matches the second joining plate to define a corresponding rotated and engaged arrangement of the first joining plate and the second joining plate across the mulling axis.

10 Claims, 6 Drawing Sheets

(56) References Cited

U.S. PATENT DOCUMENTS

| | | | | |
|---|---|---|---|---|
| 6,405,504 | B1 * | 6/2002 | Richardson | E06B 1/6007 52/843 |
| 6,722,089 | B2 * | 4/2004 | Budzinski | E06B 1/6007 52/204.5 |
| 7,481,028 | B2 | 1/2009 | Tufts et al. | |
| 7,987,633 | B2 * | 8/2011 | Lenox | E06B 3/26303 49/63 |
| 8,756,884 | B2 | 6/2014 | Tufts et al. | |
| 9,316,040 | B2 | 4/2016 | Saunders et al. | |
| 9,932,765 | B1 | 4/2018 | Kelley et al. | |
| 10,077,598 | B2 | 9/2018 | Albrecht | |
| 10,087,675 | B2 | 10/2018 | Libby et al. | |
| 10,233,688 | B1 | 3/2019 | Kelley et al. | |
| 10,626,664 | B1 | 4/2020 | Kelley et al. | |
| 10,968,687 | B1 | 4/2021 | Kelley et al. | |
| 2002/0092248 | A1 * | 7/2002 | Westphal | E06B 1/6007 52/204.5 |
| 2003/0126812 | A1 * | 7/2003 | Folsom | E06B 1/345 52/204.61 |
| 2005/0120630 | A1 * | 6/2005 | Sanders | E06B 7/215 49/365 |
| 2005/0284046 | A1 * | 12/2005 | Neal | E06B 1/366 52/204.5 |
| 2005/0284094 | A1 * | 12/2005 | Long | E06B 1/6007 52/782.1 |
| 2008/0010919 | A1 * | 1/2008 | Tufts | E06B 1/366 52/204.591 |
| 2008/0295425 | A1 * | 12/2008 | Farag | B32B 17/10293 277/642 |
| 2008/0302036 | A1 * | 12/2008 | McMahon | E06B 1/6007 52/745.09 |
| 2013/0118106 | A1 * | 5/2013 | Clark | E06B 3/26301 52/404.4 |
| 2013/0212973 | A1 * | 8/2013 | Saunders | E06B 1/366 52/656.5 |
| 2015/0010350 | A1 | 1/2015 | Emanuel | |
| 2015/0020465 | A1 * | 1/2015 | Saunders | E06B 3/663 52/204.6 |
| 2015/0300012 | A1 * | 10/2015 | Kelley | E06B 3/549 52/235 |
| 2019/0145155 | A1 * | 5/2019 | Minelli | E06B 3/26347 49/449 |
| 2020/0032510 | A1 * | 1/2020 | Claeys | E06B 1/366 |
| 2020/0270932 | A1 * | 8/2020 | Header | E06B 1/70 |
| 2021/0355745 | A1 * | 11/2021 | Shoshan | E06B 3/26347 |
| 2022/0325520 | A1 * | 10/2022 | Makwich | E04B 2/967 |

* cited by examiner

MULLING SYSTEM FOR PLURAL FENESTRATION ASSEMBLIES WITH MATCHING THERMALLY BROKEN JOINING PLATES THAT HAVE ROTATED AND ENGAGED ARRANGEMENT ACROSS MULLING AXIS

TECHNICAL FIELD

The present disclosure generally relates to a mulling system for plural fenestration assemblies and, more particularly, relates to a fenestration mulling system with matching first and second thermally broken joining plates that define a rotated and engaged arrangement across the respective mulling axis.

BACKGROUND

Fenestration units may be joined together via a mulling system to form a plural (i.e., compound) fenestration assembly. For example, two window units may be attached at their respective edges via a mulling system to define the plural fenestration assembly.

However, conventional mulling systems may be inconvenient, difficult, and time consuming to use. Manufacture of these mulling systems may be inefficient. Furthermore, thermal performance of existing mulling systems may be limited. Moreover, some mulling systems may not provide sufficient protection against moisture intrusion in some conditions.

Accordingly, it is desirable to provide an improved mulling system that is highly convenient and easy to use. It is also desirable to provide an improved mulling system that provides increased manufacturing efficiencies. Furthermore, it is desirable to provide a mulling system that provides improved thermal performance and/or increased resistance to moisture intrusion. Other desirable features and characteristics of the present disclosure will become apparent from the subsequent detailed description and the appended claims, taken in conjunction with the accompanying drawings and this background discussion.

BRIEF SUMMARY

The object of the present disclosure is solved by the subject-matter of the independent claims. Further embodiments are incorporated in the dependent claims.

In one embodiment, a mulling system for a plurality of fenestration units is disclosed. The mulling system includes a first joining plate that extends longitudinally along a mulling axis. The first joining plate is configured to attach to a first outer edge of a first fenestration unit. The first joining plate includes a first plate member, a second plate member, and a first thermal breaker that extend longitudinally along the mulling axis with the first thermal breaker attaching the first and second plate members. The mulling system also includes a second joining plate that extends longitudinally along the mulling axis. The second joining plate is configured to attach to a second outer edge of a second fenestration unit. The second joining plate includes a third plate member, a fourth plate member, and a second thermal breaker that extend longitudinally along the mulling axis with the second thermal breaker attaching the third and fourth plate members. The second joining plate is configured to attach to the first joining plate to join together the first fenestration unit and the second fenestration unit with the mulling axis extending between the first joining plate and the second joining plate. The first joining plate substantially matches the second joining plate to define a corresponding rotated and engaged arrangement of the first joining plate and the second joining plate across the mulling axis.

In another embodiment, a fenestration assembly is disclosed that includes a first fenestration unit with a first outer edge and a second fenestration unit with a second outer edge. The fenestration assembly also includes a mulling system that attaches the first fenestration unit and the second fenestration unit at the first outer edge and the second outer edge, respectively. The mulling system includes a first joining plate that extends longitudinally along a mulling axis. The first joining plate is attached to a first outer edge of the first fenestration unit. The first joining plate includes a first plate member, a second plate member, and a first thermal breaker that extend longitudinally along the mulling axis with the first thermal breaker attaching the first and second plate members. The fenestration assembly also includes a second joining plate that extends longitudinally along the mulling axis. The second joining plate is attached to a second outer edge of a second fenestration unit. The second joining plate includes a third plate member, a fourth plate member, and a second thermal breaker that extend longitudinally along the mulling axis with the second thermal breaker attaching the third and fourth plate members. The second joining plate is attached to the first joining plate to join together the first fenestration unit and the second fenestration unit with the mulling axis extending between the first joining plate and the second joining plate. The first joining plate substantially matches the second joining plate to define a corresponding rotated and engaged arrangement of the first joining plate and the second joining plate across the mulling axis.

In an additional embodiment, a mulling system for a plurality of fenestration units is disclosed that includes a first joining plate that extends longitudinally along a mulling axis. The first joining plate is configured to attach to a first outer edge of a first fenestration unit. The first joining plate includes a first plate member, a second plate member, and a first thermal breaker that extend longitudinally along the mulling axis with the first thermal breaker attaching the first and second plate members. The mulling system also includes a second joining plate that extends longitudinally along the mulling axis. The second joining plate is configured to attach to a second outer edge of a second fenestration unit. The second joining plate includes a third plate member, a fourth plate member, and a second thermal breaker that extend longitudinally along the mulling axis with the second thermal breaker attaching the third and fourth plate members. The second joining plate is configured to attach to the first joining plate in an engaged arrangement to join together the first fenestration unit and the second fenestration unit with the mulling axis extending between the first joining plate and the second joining plate. In the engaged arrangement, the first joining plate and the second joining plate overlap with the first thermal breaker overlapping second thermal breaker.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a mulling system for assembling a plurality of fenestration units. The mulling system may include a first joining plate configured to attach to a first edge of a first fenestration unit and a second joining plate configured to attach to a second edge of a second fenestration unit. The first and second joining plates may be attached to assemble the first and second fenestration units together. Both the first and second joining plates may individually include first and second plate members that are joined together by respective thermal breaker members. The thermal breaker members may limit heat transfer in an interior-exterior direction via the mulling system. Accordingly, the thermal breaker members may improve thermal performance of the mulling system.

The first joining plate and the second joining plate may have corresponding and complementary features. In some embodiments, the first joining plate and the second joining plate may be common (e.g., matching, substantially identical, etc.) to each other, but the first joining plate may be rotated about a mulling axis relative to the second joining plate. Accordingly, in a cross-section of the first joining plate and the second joining plate along the interior-exterior direction, the joining plates may define a corresponding rotated and engaged arrangement of the first joining plate and the second joining plate across the mulling axis. Accordingly, manufacture and use of the mulling system may be facilitated.

Figure 1:
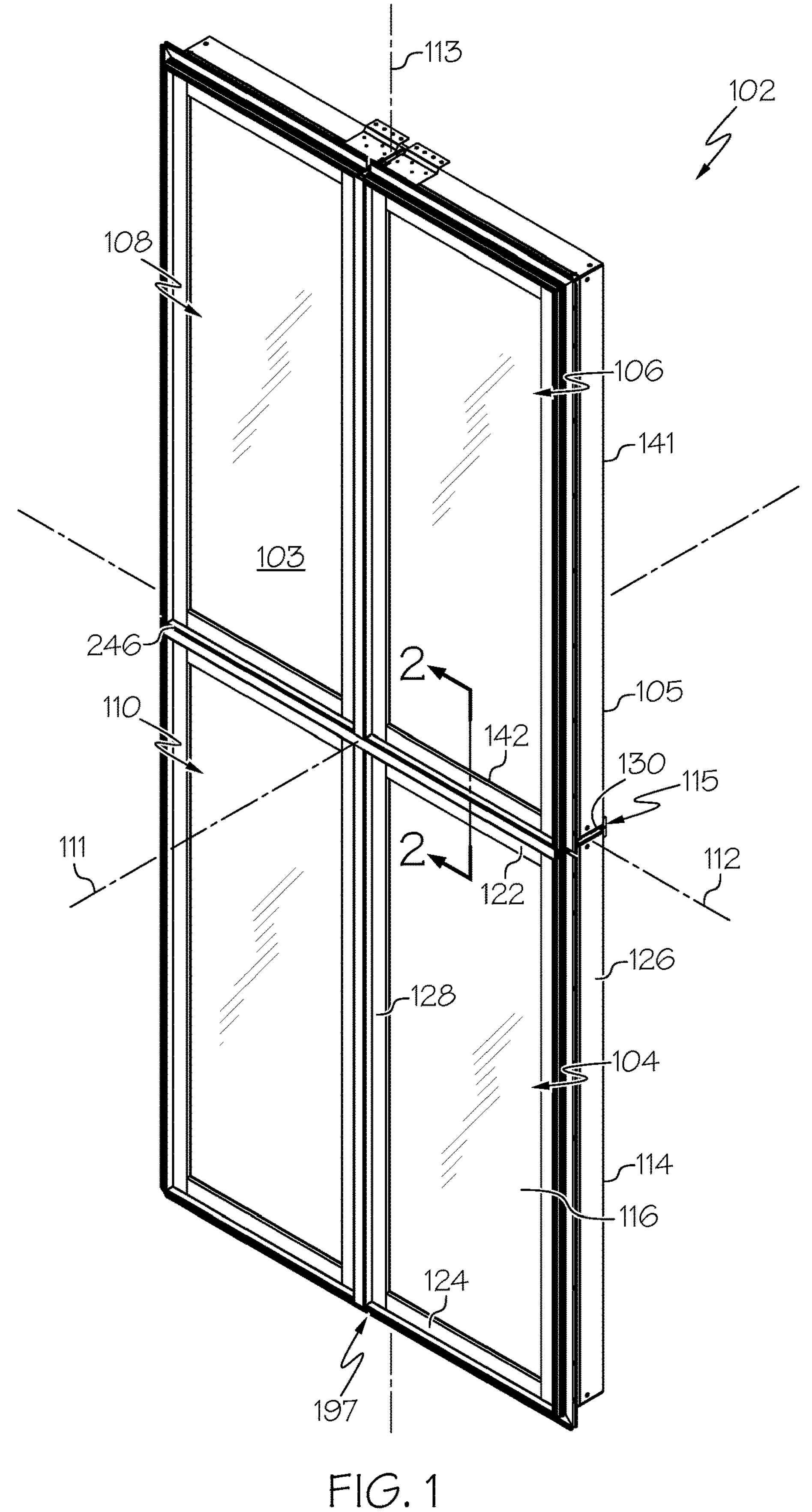
FIG. 1 is a perspective view of a plural fenestration assembly that includes a mulling system according to example embodiments of the present disclosure.

Referring now to FIG. 1 a plural fenestration assembly 102 is shown. The plural fenestration assembly 102 may include a first fenestration unit 104, a second fenestration unit 106, a third fenestration unit 108, and a fourth fenestration unit 110, each of which may be rectangular window units. In some embodiments, the fenestration units 104, 106, 108, 110 may have substantially similar (e.g., substantially identical) sizes and shapes. For example, the fenestration units 104, 106, 108, 110 may be rectangular with similar dimensions. The fenestration units 104, 106, 108, 110 may be assembled together edge-to-edge to collectively define the fenestration assembly 102. Collectively, the units 104, 106, 108, 110 may define a larger rectangular shape for the plural fenestration assembly 102.

The fenestration assembly 102 may define a Cartesian coordinate system. Specifically, the fenestration assembly 102 may define a first axis 111, a second axis 112, and a third axis 113. The first axis 111 may extend horizontally between an outer side 103 and an inner side 105 of the fenestration assembly 102. The second axis 112 may extend horizontally in a transverse direction along the fenestration assembly 102. The third axis 113 may extend vertically along the fenestration assembly 102.

It will be appreciated that the fenestration assembly 102 may include any number of fenestration units 104, 106, 108, 110. The fenestration units 104, 106, 108, 110 may also have any suitable size and shape without departing from the scope of the present disclosure.

As will be discussed, the fenestration units 104, 106, 108, 110 may be assembled together using a mulling system 115. The mulling system 115 may include a number of components that robustly attach opposing edges of the fenestration units 104, 106, 108, 110. The mulling system 115 may provide convenience, ergonomics, time savings, and/or additional advantages. The mulling system 115 may also be configured for use in the field (i.e., field-mulling use at a construction site rather than at a window manufacturing facility) for added benefit. Furthermore, the mulling system 115 may have a low part count, may be highly manufacturable, etc. These advantages may be realized without compromising on the mechanical strength of the joint provided. Furthermore, the mulling system 115 can provide high thermal performance, for example, by limiting heat transfer in the interior-exterior direction (i.e., along the first axis 111).

Embodiments of the first fenestration unit 104 will now be discussed. Features of the first fenestration unit 104 may be similar to the second, third, and/or fourth fenestration units 106, 108, 110.

The first fenestration unit 104 may include a rectangular frame 114 that supports a glazing unit 116 therein. In some embodiments, the first fenestration unit 104 may be non-operational, meaning that the glazing unit 116 is fixed within the frame 114; however, other embodiments may be configured with the first fenestration unit 104 including hinges or other joinery to moveably (e.g., hingeably) move within the frame 114. The frame 114 and/or other portions of the frame 114 may be constructed from and/or include any suitable materials without departing from the scope of the present disclosure. For example, in some embodiments, the frame 114 may be made from and/or include any of: wood, wood products, vinyl, other polymeric materials, etc. In some embodiments, the frame 114 may be configured for a vinyl-cladded wood window.

The frame 114 may include an upper rail 122 and a lower rail 124, which may be parallel and separated along the third axis 113. The frame 114 may also include a first stile 126 and a second stile 128 that are parallel, that are separated along the second axis 112, and that extend between the upper and lower rails 122, 124.

Figure 2:
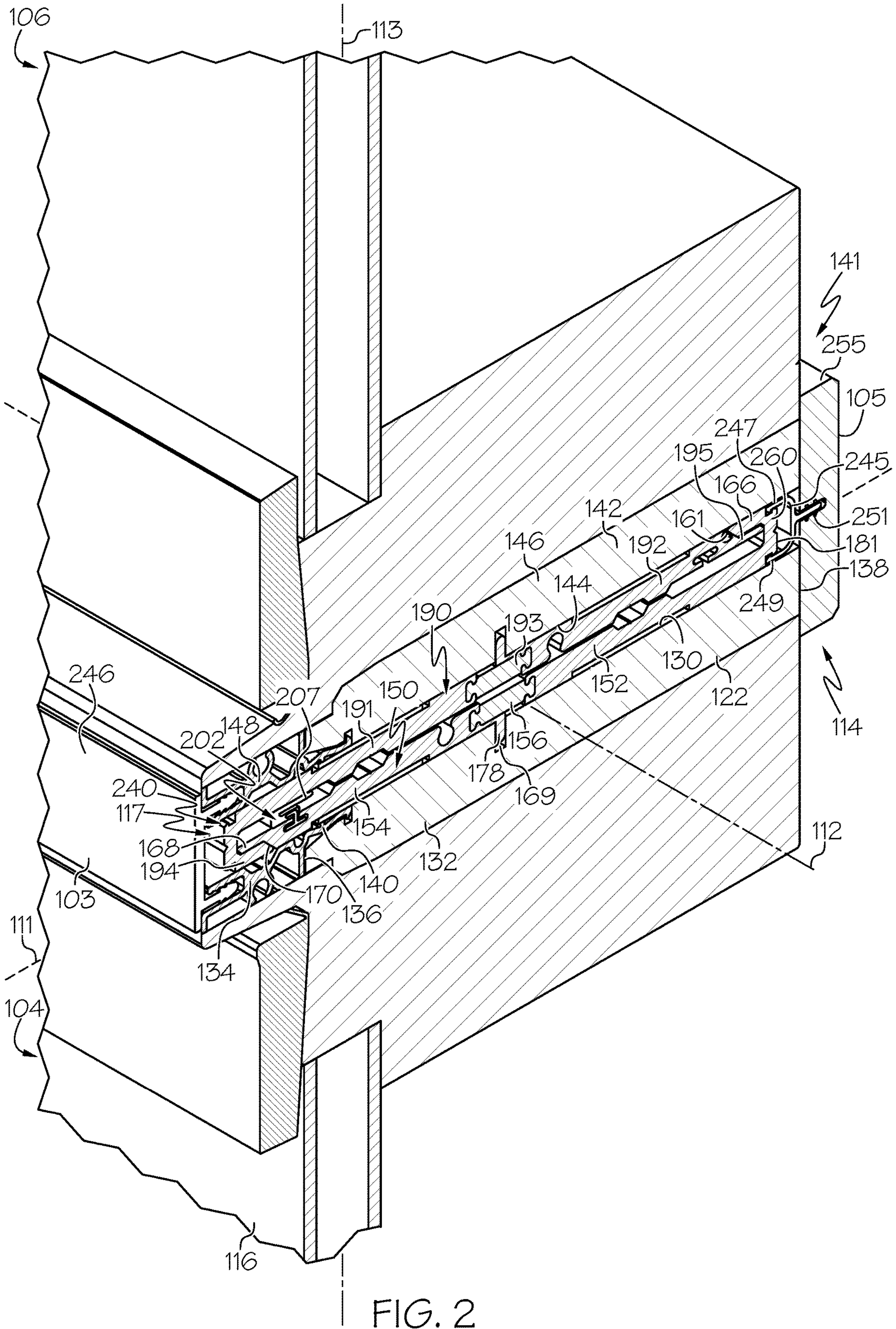
FIG. 2 is a perspective cross-sectional view of the plural fenestration assembly taken along the line 2-2 of FIG. 1, which includes the mulling system according to example embodiments of the present disclosure.

As shown in FIGS. 1 and 2, the upper rail 122 may define a first outer edge 130 of the frame 114. The first outer edge 130 may face generally upward along the axis 113 and toward the second fenestration unit 106. As shown in FIG. 2, the first outer edge 130 may be collectively defined by a rail support member 132 and a cladding member 134 of the upper rail 122. The rail support member 132 may have an outer edge 136 and an inner edge 138, which are separated along the first axis 111. The cladding member 134 may be a thin-walled, hollow, elongate, lineal member with attachment walls 140 that extend around and attach (e.g., clip, interference fit, etc.) to the outer edge 136 of the rail support member 132. The first upper rail 122 may also have other parts that, for example, support the glazing unit 116, attach to the first stile 126, attach to the second stile 128, etc.

The second fenestration unit 106 may be substantially similar to the first fenestration unit 104. As shown in FIG. 2, a frame 141 of the second fenestration unit 106 may include a lower rail 142 that includes a second outer edge 144. The second outer edge 144 may face generally downward along the axis 113 and toward the outer edge 130 of the first fenestration unit 104. Like the first fenestration unit 104, the second outer edge 144 may be collectively defined by a rail support member 146 and a cladding member 148 of the lower rail 142.

The mulling system 115 may be configured for joining the first outer edge 130 of the first fenestration unit 104 to the second outer edge 144 of the second fenestration unit 106. In some embodiments, the mulling system 115 may include a joining plate 150, such as the embodiments represented in FIG. 3.

The joining plate 150 may be relatively flat with an outer face 158, an inner face 160, a first edge 162, and a second edge 164. The joining plate 150 may be elongate and may extend longitudinally along the axis 112.

The first edge 162 may curl upward and back toward the second edge 164 to define a hook 166. The hook 166 may define a rectangular undercut that is open on one side. The hook 166 may also include an internal ramp surface 161 that ramps up in thickness from the end of the hook 166 to the undercut.

The second edge 164 may comprise a thin flange 168 that is substantially planar and that projects parallel to the first axis 111. A ridge 170 may also be included proximate the second edge 164, on the inner face 160 of the joining plate 150.

In some embodiments, the joining plate 150 may include a first plate member 152 and a second plate member 154, which are joined together at a thermal breaker 156 (i.e., thermal break, thermal break member, etc.). The first plate member 152 and/or second plate member 154 may be constructed from a metal material, such as aluminum or steel plate. The thermal breaker 156 may be made from a material that has lower thermal conductivity (i.e., a thermally insulative material, a material with a lower coefficient of thermal conductivity than that of the first and second plate members 152, 154). In some embodiments, the thermal breaker 156 may be made from a polymeric material or composite material. In some embodiments, the first plate member 152, the second plate member 154 and/or the thermal breaker 156 may be an extruded part (i.e., formed via a respective extrusion process). In some embodiments, a pour-and-debridge process is employed, wherein the first and second plate members 152, 154 may be extruded together with a connecting part that connects the plate members 152, 154. The connecting part may also partly define a cavity with a shape corresponding to that of the thermal breaker 156. Then, molten material may be poured into the cavity and cured to form the thermal breaker 156 therein. Subsequently, the connecting part may be cut away, leaving the plate members 152, 154 and the thermal breaker 156 in place as shown in the drawings.

In some embodiments, the first plate member 152 may include the hook 166, and the first plate member 152 may include a first attachment edge 172. The first attachment edge 172 may include a bulb-shaped channel 174 that receives one edge of the thermal breaker 156. The second plate member 154 may include the flange 168, and the second plate member 154 may include a second attachment edge 175. The second attachment edge 175 may include a bulb-shaped channel 176 that receives another edge of the thermal breaker 156. The second plate member 154 may also include an alignment fin 178 that projects from the second attachment edge 175 and that turns out ninety degrees and terminates to define the fin 178.

The thermal breaker 156 may be elongate and flat and may include bulbous edges that correspond in shape to the channels 174, 176. The thermal breaker 156 may also include an intermediate strip 180 of any suitable width (measured along the first axis 111).

Figure 3:
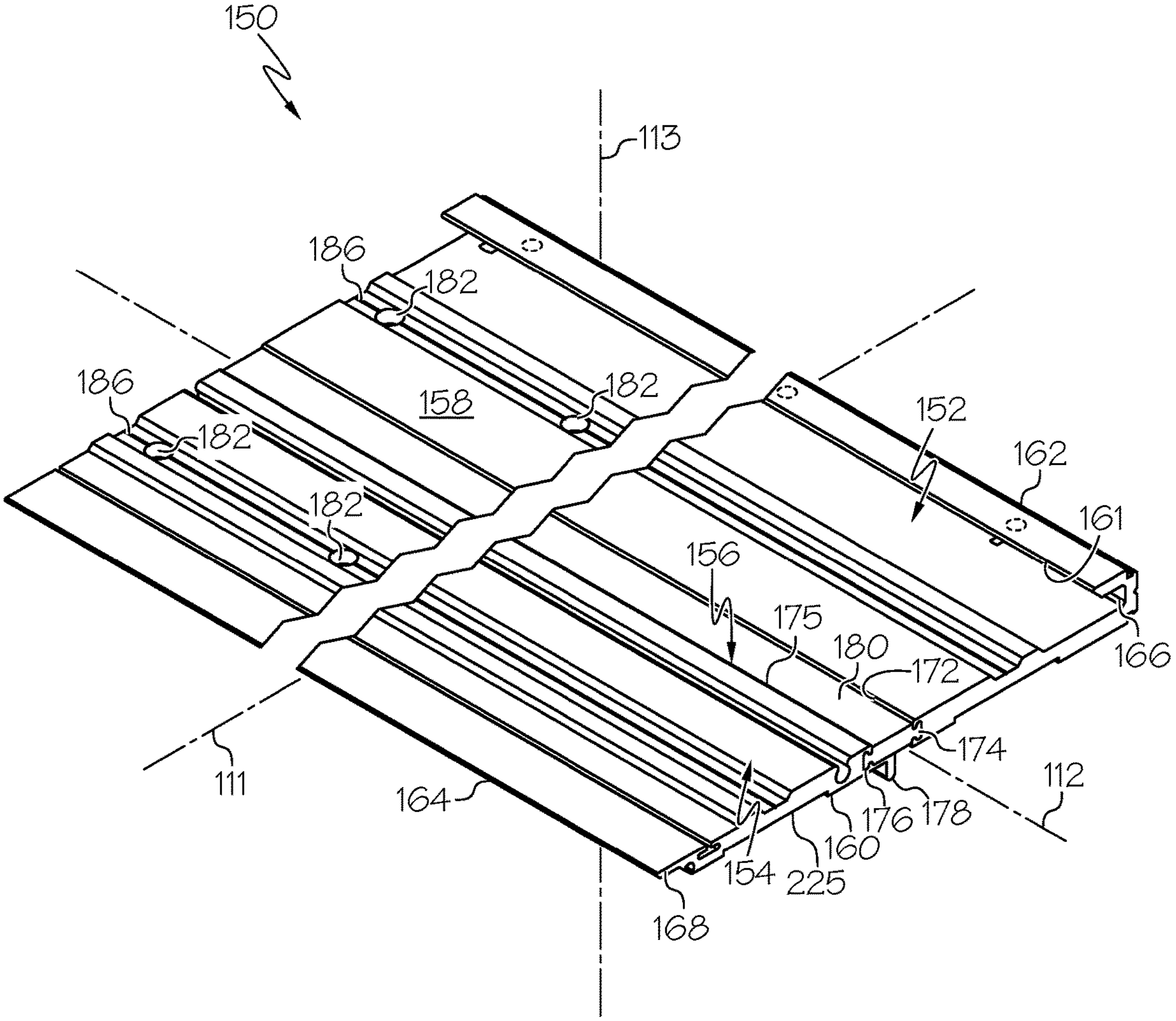
FIG. 3 is a perspective view of a joining plate of the mulling system of FIG. 2.

When attached as shown in FIG. 3, the thermal breaker 156 may be received in the channels 174, 176. The first plate member 152, the intermediate strip 180, and the second plate member 154 may collectively define the outer face 158 of the joining plate 150. Also, the inner face 160 of the joining plate 150 may be collectively defined by the first plate member 152, the intermediate strip 180, and the second plate member 154.

Figure 5:
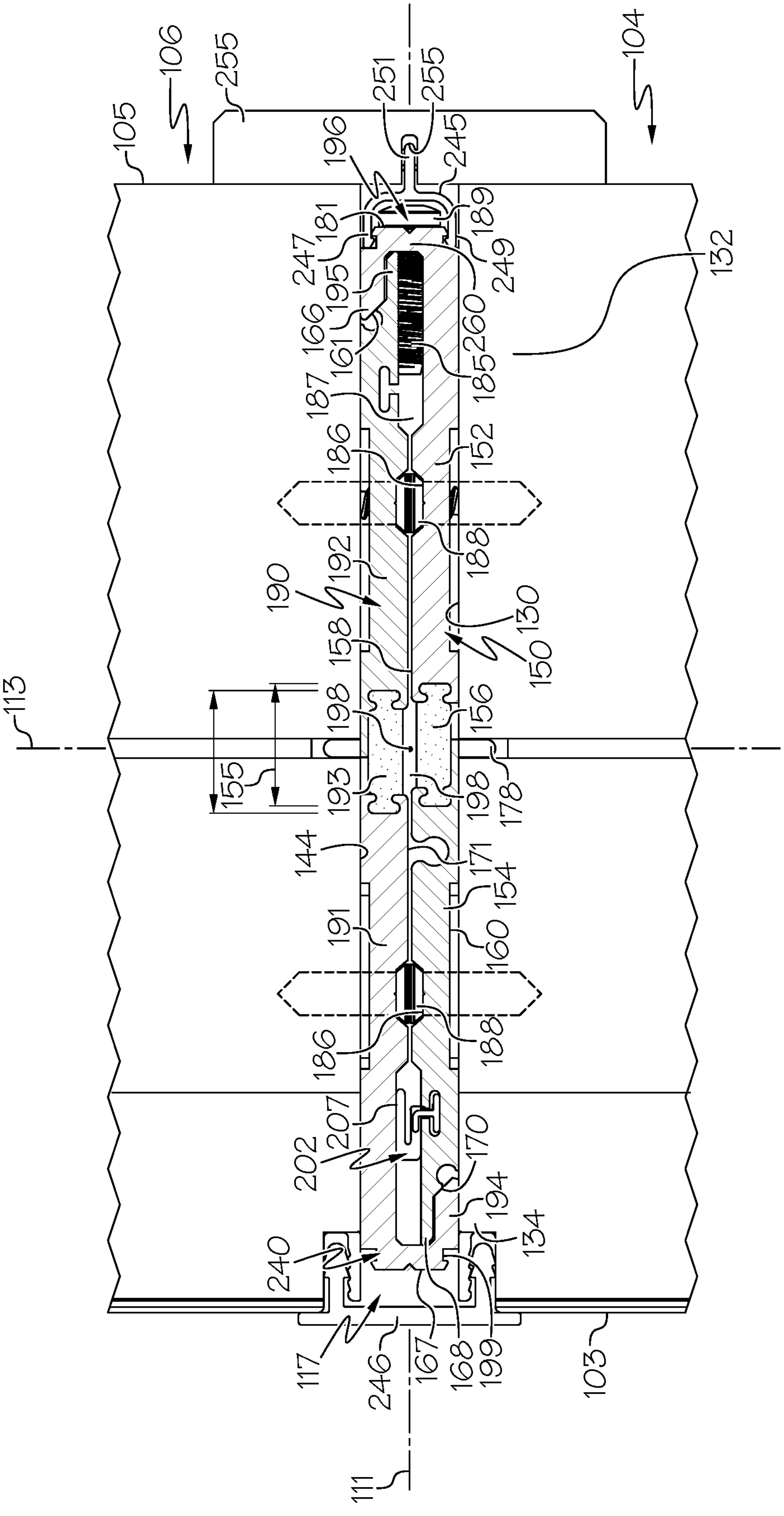
FIG. 5 is a plan cross-sectional view of the mulling system of FIG. 2.

As shown in FIGS. 2 and 5, the joining plate 150 may be fixedly attached to the first outer edge 130 of the first fenestration unit 104. In some embodiments, the inner face 160 may be layered over the first outer edge 130 with the hook 166 extending along the inner side 105 and the flange 168 extending along the outer side 103 along the axis 112. The joining plate 150 may overlie both the rail support member 132 and the cladding member 134 as shown in FIGS. 2 and 5.

Fasteners 188, such as screws, may extend along the third axis 113 through the joining plate 150 and into the rail support member 132 of the upper rail 122. As shown in FIG. 3, the joining plate 150 may include one or more fastener apertures 182 (e.g., pilot holes, etc.) in the first and second plate members 152, 154 that extend therethrough for positioning and receiving fasteners. Moreover, the joining plate 150 may include a recessed channel 186 on the outer face 158. The heads of the fasteners 188 may be flush or below the outer face 158 when the joining plate 150 is attached to the first fenestration unit 104 (see FIG. 5).

Furthermore, the alignment fin 178 may be received in a corresponding groove 169 of the rail support member 132. The alignment fin 178 may be received in the groove 169, thus positioning the first joining plate 150 to the first fenestration unit 104 at a controlled, predetermined position along the axis 111.

Figure 4:
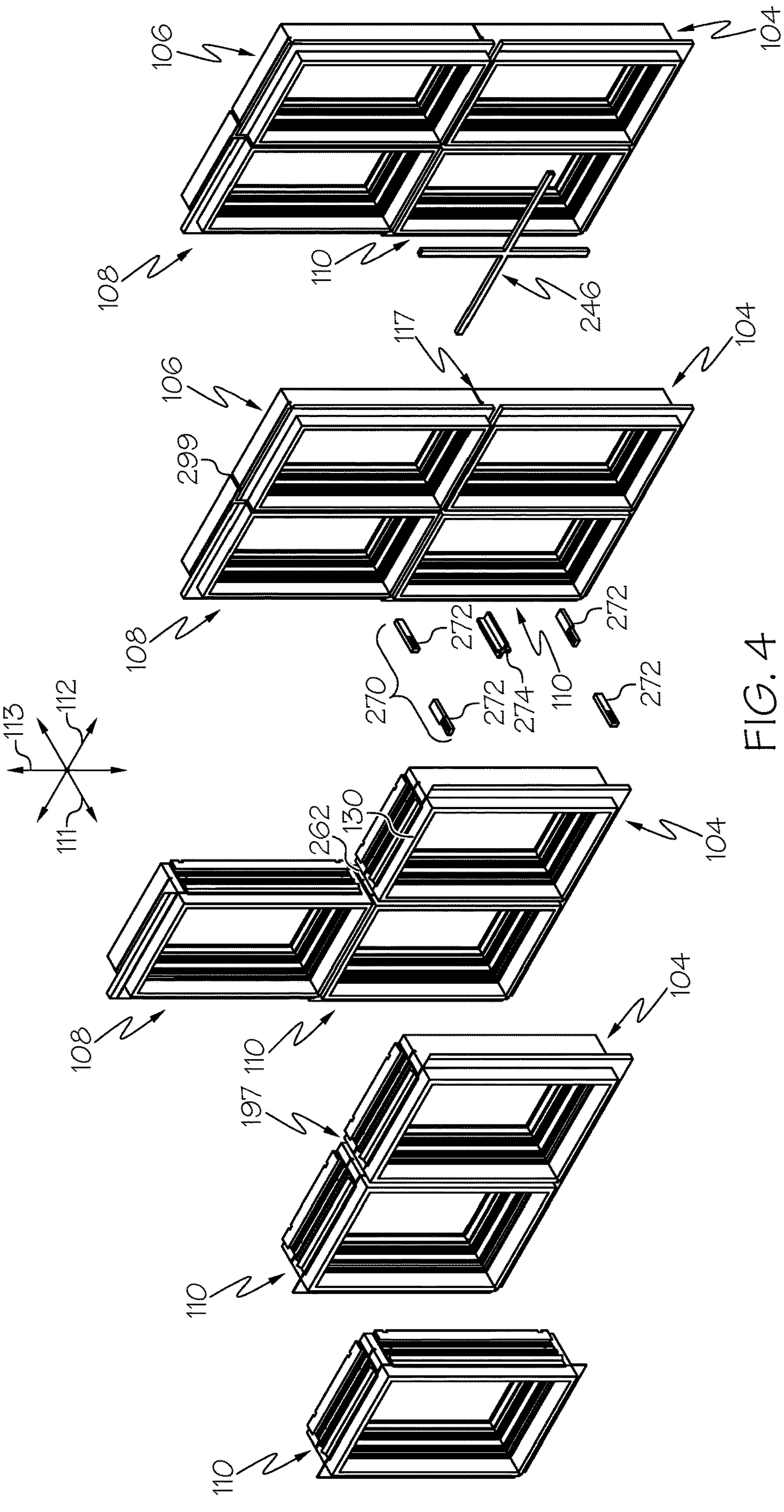
FIG. 4 is a perspective view representing a method of assembling the plural fenestration assembly with the mulling system of FIG. 2 according to example embodiments of the present disclosure.

The joining plate 150 may be considered a first joining plate 150 of the mulling system 115. The first joining plate 150 may be disposed on one side of a mulling axis 198. In FIG. 5, the mulling axis 198 is parallel to the second axis 112. However, it will be appreciated that the mulling axis 198 may be parallel to the third axis 113, for example, when mulling the first fenestration unit 104 to the fourth fenestration unit 110 (FIG. 4).

The mulling system 115 may also include a second joining plate 190. The second joining plate 190 may be substantially similar to the first joining plate 150. The second joining plate 190 may match, correspond, may be common to, and/or may include the same features as the first joining plate 150. In other words, FIG. 3 may represent embodiments of the first joining plate 150 as well as the second joining plate 190. Thus, the same parts may be used for the first joining plate 150 as are used in the second joining plate 190.

More specifically, as shown in FIGS. 2 and 5, the second joining plate 190 may include a third plate member 191, which may correspond to the first plate member 152, and a fourth plate member 192, which may correspond to the second plate member 154. The second joining plate 190 may also include a second thermal breaker 193 that joins the third and fourth plate members 191, 192. Moreover, the third plate member 191 may include a hook 194, and the fourth plate member 192 may include a flange 195.

The second joining plate 190 may be attached to the second fenestration unit 106 with the hook 194 disposed on the outer side 103 and the flange 195 proximate the inner side 105. This is opposite the arrangement of the first joining plate 150. The second joining plate 190 may be positioned substantially as a one-hundred-eighty degree (180) rotation of the first joining plate 150 about the mulling axis 198.

The second joining plate 190 may be attached and engaged with the first joining plate 150 at a mull joint 117 represented in FIGS. 2 and 5. The mulling axis 198 may extend along the mull joint 117. As shown, the hook 194 may receive the flange 168, the hook 166 may receive the flange 195, and the outer face 158 may closely underlie and opposingly face the second joining plate 190. In other words, the first and second joining plates 150, 190 may layer on each other and engage at their inner and outer edges. There may be a small degree of clearance or gap between the opposing faces of the joining plates 150, 190 when engaged. The edges may engage to make the joint highly robust.

Furthermore, in some embodiments, one or more end fasteners 196 may be inserted for further strengthening the attachment of the mull joint 117. The end fasteners 196 may include a shank 185 and a head 189. In the fastened position represented in FIG. 5, the head 189 may seat against an outer edge surface 181 of the hook 166. The shank 185 may extend through the hook 166 into a cavity 187 defined between the flange 195 and the first joining plate 150. The shank 185 may abut, threadably engage, attach or otherwise fasten to the first joining plate 150 and/or the second joining plate 190. For example, the shank 185 may push the joining plates 150, 190 apart along the third axis 113 to strengthen engagement of the hooks 166, 194 and flanges 168, 195, respectively. As shown in FIG. 3, the outer edge surface 181 may include a groove 163 that runs longitudinally along the axis 112. The groove 163 may help position the shank 185 of the fastener 196 as it is drilled into the cavity 187 during assembly of the mull joint 117.

The mull joint 117 may be defined across the mulling axis 198 (FIG. 5). The mulling axis 198 may be parallel to the second axis 112 when attaching the first fenestration unit 104 and the second fenestration unit 106. The mulling axis 198 may be substantially centered between the first and second joining plates 150, 190 along the third axis 113 (measured between the outer face 158 of the first joining plate 150 and the opposing outer face 171 of the second joining plate 190). The mulling axis 198 may also be substantially centered in the mull joint 117 in the width direction along the first axis 111 (measured between the outer edge surface 181 and the opposite outer edge surface 167 of the second joining plate 190).

It will be appreciated that the first joining plate 150 and the second joining plate 190 may be defined, substantially, by the same parts. They may be constructed from the same (i.e., common) parts. Specifically, the third plate member 191 and the first plate member 152 may be constructed from the same lineal extrusions in an extrusion process. Likewise, the fourth plate member 192 and the second plate member 154 may be formed from the same lineal extrusion. The thermal breakers 156, 193 may be made from the same process (extrusion, molding, etc.) as well. This may increase manufacturing efficiency significantly, making part manufacture less costly, reducing stocking costs, etc.

The first and second joining plates 150, 190 may be arranged across the mulling axis 198 to have corresponding features, shapes, surfaces, etc. for engaging each other in a mulled pair. The second joining plate 190 may correspond in shape to the first joining plate 150. The second joining plate 190 may substantially define a one-hundred-eighty-degree (180°) rotation of the first joining plate 150 about a mulling axis 112. In other words, in the cross section of FIG. 5 normal to the mulling axis 198, the outer profile of the first joining plate 150 (that which is illustrated in FIG. 3) matches and overlies the outer profile of the second joining plate 190 when rotated one-hundred-eighty-degree (180°) about the mulling axis 112. It will be appreciated that, in actuality, there may reasonable and normal tolerance build-up in the fenestration assembly 102 and/or in the mull joint 117 such that there may be misalignment if rotated and overlaid. However, the rotated outer profiles of the first and second joining plates 150, 190 may substantially overlie each other as those skilled in the art understand the meaning herein.

In this arrangement, the mull joint 117 may be highly robust for high-strength attachment of the first and second fenestration units 104, 106. The mull joint 117 may also provide thermal benefits. The thermal breakers 156, 193 may be proximate each other to provide insulation. As such, heat transfer via the mull joint 117 may be limited. As shown in FIG. 5, the thermal breakers 156, 193 may at least partly overlap along the first axis 111 (i.e., in the inward-outward direction). The first thermal breaker 156 may define a first width 155 and the second thermal breaker 193 may define a second width 153. The first thermal breaker 156 and the second thermal breaker 193 may overlap along the third axis 113. A majority of the widths 153, 155 may overlap as shown in FIG. 5. This overlapping and substantial alignment of the thermal breakers 156, 193 may provide a robust thermal break—one that can insulate against heat transfer via the mull joint 117.

The mulling system 115 may further include features that provide protection against moisture intrusion, that direct moisture in a predetermined direction, that seal and/or fill voids, etc. For example, as shown in FIGS. 5 and 6, the mulling system 115 may include a first deflectable seal member 202.

The first deflectable seal member 202 may be constructed from a polymeric or composite material that has sufficient flexibility. The seal member 202 may include a first strip 204 and a second strip 206 that are connected at their edges to define a deflectable joint 208 of the seal member 202. As represented in FIG. 6, the joint 208 may moveably connect the second strip 206 to the first strip 204 such that the deflectable seal member 202 may move between a neutral position (shown in phantom in FIG. 6) and a flexed position (shown in solid lines in FIGS. 5 and 6). In the neutral position, the seal member 202 may be V-shaped in cross-section, and the second strip 206 and the first strip 204 may extend away at an angle with the joint 208 being the vertex thereof. In the flexed position, the second strip 206 may fold toward the first strip 204 to layer more closely over the first strip 204. The seal member 202 may also include a retainer ridge 210 that projects from the back of the first strip 204 to be received in a corresponding aperture 212 (e.g., an undercut groove) in the joining plate 150. The seal member 202 may, thus be disposed closer to the outer side 103 than the inner side 105 along the axis 111.

When installed in the mull joint 117, first strip 204 may abut, layer over, and deflect against the outer face 158 of the first joining plate 150. The second strip 206 may include an outer sealing surface 207 that seals abuts, layers over, and deflects against the opposing outer face 171 of the second joining plate 190. The outer sealing surface 207 may lie substantially within a plane and may face away from the first joining plate 150. The outer sealing surface 207 may seal against the outer face 171 to establish a robust seal against moisture.

Figure 6:
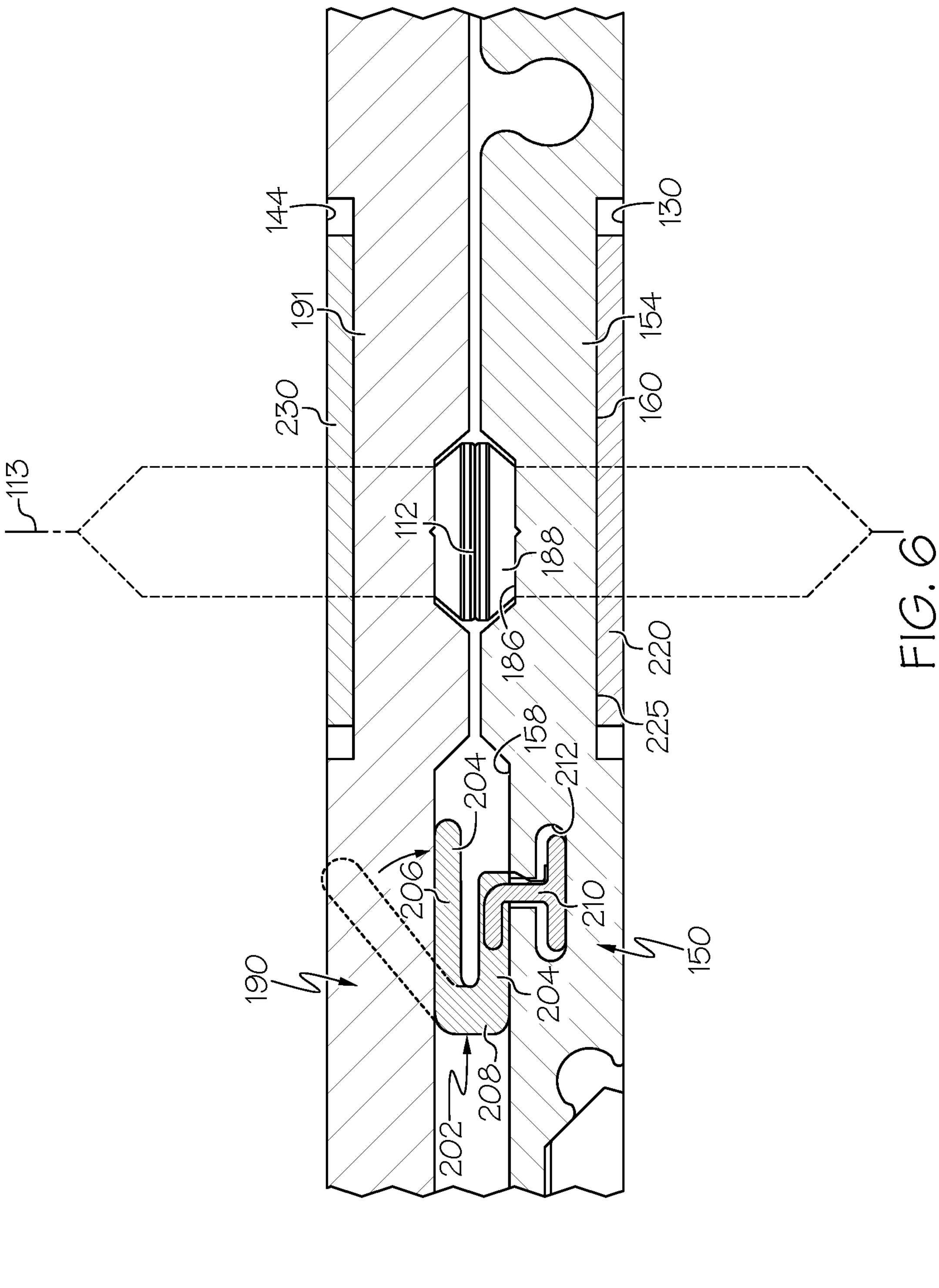
FIG. 6 is a detail cross-sectional view of seals of the mulling system of FIG. 2.

Furthermore, as shown in FIG. 6, the mulling system 115 may include a second seal member 220. The second seal member 220 may be a strip of sealing tape made from a compressible material. The second seal member 220 may extend along the inner face 160 of the first joining plate 150 and the outer edge 130 of the first fenestration unit 104. As shown in FIG. 3, the first joining plate 150 may have a recessed channel 225 extending along the axis 112 for receiving the second seal member 220. The recessed channel 225 may have a shallow, rectangular profile. The second seal member 220 may, in some embodiments, adhesively attach to the inner face 160 of the joining plate 150 within the channel 225. When installed in the mull joint 117, the second seal member 220 may compress and seal between the inner face 160 and the outer edge 130 of the first fenestration unit 104.

As shown in FIG. 6, the mulling system 115 may additionally include a third seal member 230. The third seal member 230 may be substantially similar to the second seal member 220, except that the third seal member 230 may be disposed on the opposite side of the mulling axis 198, within its corresponding channel 231. Accordingly, the seal member 230 may seal between the second joining plate 190 and the second outer edge 144 of the second fenestration unit 106.

As shown in FIG. 6, the fasteners 188 may be aligned somewhat with the second and/or third seal members 220, 230. The apertures 182 may have axes that intersect and extend through the second and third seal members 220, 230. Thus, the fasteners 188 may penetrate and extend through the respective one of the second and third seal members 220, 230. The second and third seal members 220, 230 may seal about the fasteners 188 to seal against moisture intrusion.

As shown in FIGS. 2 and 5, the first and second joining plates 150, 190 may be configured to support covering parts that cover over the mull joint 117 (e.g., trim, cladding, or other covering parts). For example, at the outer side 103, the first and second joining plates 150, 190 may define an outer lip 240 on an outer edge surface of the hook 194. The outer lip 240 may include the outer edge surface 167 that is squared off and extends largely in a plane that extends along the longitudinal axis 112. The outer lip 240 may be projected slightly along the axis 111 such that the outer edge surface 167 is disposed with grooves 199 on opposite sides of the mulling axis 198. The outer lip 240 may be engaged by the cladding member 134 of the first fenestration unit 104 and the corresponding cladding member 148. The cladding members 134, 148 may also define grooves for receiving and retaining an outer strip 246 (i.e., a covering member), which extends along the mulling axis 198 and that spans between the first fenestration unit 104 and the second fenestration unit 106 to covers over the mull joint 117.

Furthermore, at the inner side 105, the first joining plates 150 may define an inner lip 260 where the hook 166 wraps around the flange 195 and that includes the outer edge surface 181 (FIGS. 2 and 5). The inner lip 260 may correspond to the outer lip 240 and may provide support for a covering member that covers the mull joint 117 on the inner side 105. For example, the mulling system 115 may include a clip 245, which is an elongate member that extends longitudinally along the mulling axis 198. The clip 245 may include a pair of clip legs 247, 249 and a spine 251 that project in opposite directions along the first axis 111. The clip legs 247, 249 may grip around and clip to the inner lip 260. The spine 251 may be received in a groove 253 of an interior trim part 255, which spans between the first fenestration unit 104 and the second fenestration unit 106 to cover the mull joint 117 on the inner side 105.

Additional components and features will be discussed in relation to FIG. 4, which illustrates a method of mulling together the first, second, third, and fourth fenestration units 104, 106, 108, 110. It will be appreciated that the mulling system 115 may include a number of pairings of the first and second joining plates 150, 190 to assemble the fenestration units 104, 106, 108, 110. For example, the first fenestration unit 104 and the fourth fenestration unit 110 may be joined using the first and second joining plates 150, 190 at a first mull joint 197. The first mull joint 197 may, thus run vertically along the third axis 113. At the first mull joint 197, the first joining plate 150 may be attached to the first fenestration unit 104 and the second joining plate 190 may be attached to the fourth fenestration unit 110 with the second and third seal members 220, 230 installed as discussed above. Then the fourth fenestration unit 110 may be advanced toward the first fenestration unit 104, causing the ramp surface 161 to guide the flange 195 into the hook 166, and causing the hook 194 to hook under the flange 168. This movement may also cause the second strip 206 of the first seal member 202 to flex from the neutral position to the flexed and sealed position against the first strip 204. Then, the fasteners 188 may be drilled into the cavity 187.

This assembly process may be repeated as shown in FIG. 4 when attaching the third fenestration unit 108 to the fourth fenestration unit 110 at a second mull joint 262 that runs horizontally along the axis 112. Subsequently, the second fenestration unit 106 may be attached to the first fenestration unit 104 at the mull joint 117 discussed above. Attachment of the second fenestration unit 106 may simultaneously form the mull joint 117 as well as a fourth, vertical mull joint 299 between the second fenestration unit 106 and the third fenestration unit 108.

In additional embodiments, the mulling system 115 may include one or more end plugs 270. There may be a central end plug 274, which is received at the junction of each of the mull joints 117, 197, 262, 299, proximate the center of the fenestration assembly 102. The central end plug 274 may be cruciform and may be shaped to be received in the cruciform gap where the mull joints 117, 197, 262, 299 meet. The mulling system 115 may also include a plurality (e.g., four) outer end plugs 272. The outer end plugs 272 may be rod- or stake-shaped and they may correspond in shape to be received in the box-shaped gap between respective mull joints 117, 197, 262, 299. The end plugs 270 may fill substantial portions of the gaps. the end plugs 270 may also include one or more openings for directing sealant (e.g., a silicone sealant) within the gaps. The sealant may be cured with the end plugs 270 installed.

Then, the outer trim strip 246 may be installed as discussed above. In some embodiments, the outer trim strip 246 may be cruciform and may continuously cover over gaps between the fenestration units 104, 106, 108, 110. In additional embodiments, the outer trim strip 246 may include a horizontal exterior trim piece that runs edge-to-edge, and there may be two additional vertical pieces of trim with one positioned above and the other positioned below.

Accordingly, the mulling system 115 provides a number of advantages. The mull joints 117 may be robust, moisture resistant, easy to assemble, and more. The part count may be low and manufacturing parts may be efficient. Thermal conductivity may also be relatively low using the mulling system 115 of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A mulling system for a plurality of fenestration units comprising:

a first joining plate that extends longitudinally along a mulling axis, the first joining plate configured to attach to a first outer edge of a first fenestration unit, the first joining plate including a first alignment fin configured to be received in a first groove of the first fenestration unit, the first joining plate including a first plate member, a second plate member, and a first thermal breaker that extend longitudinally along the mulling axis with the first thermal breaker attaching the first and second plate members;

a second joining plate that extends longitudinally along the mulling axis, the second joining plate configured to attach to a second outer edge of a second fenestration unit, the second joining plate including a second alignment fin configured to be received in a second groove of the second fenestration unit, the second joining plate including a third plate member, a fourth plate member, and a second thermal breaker that extend longitudinally along the mulling axis with the second thermal breaker attaching the third and fourth plate members;

the second joining plate configured to attach to the first joining plate to join together the first fenestration unit and the second fenestration unit with the mulling axis extending between the first joining plate and the second joining plate;

the first joining plate substantially matching the second joining plate to define a corresponding rotated and engaged arrangement of the first joining plate and the second joining plate across the mulling axis;

wherein, in the rotated and engaged arrangement, the first thermal breaker aligns with and overlaps the first alignment fin along a first transverse axis extending perpendicular to the mulling axis from one side thereof; and wherein, in the rotated and engaged arrangement, the second thermal breaker aligns with and overlaps the second alignment fin along a second transverse axis extending perpendicular to the mulling axis from an opposite side thereof.

2. The mulling system of claim 1, wherein the rotated and engaged arrangement includes the first joining plate defines a one-hundred-eighty degree rotation of the second joining plate with respect to the mulling axis in the corresponding arrangement.

3. The mulling system of claim 2, wherein the first joining plate includes a first hook and a first flange disposed on opposite edges thereof;

wherein the second joining plate includes a second hook and a second flange disposed on opposite edges thereof; and wherein the first hook is configured to receive the second flange and the second hook is configured to receive the first flange to attach the first joining plate and the second joining plate.

4. The mulling system of claim 3, further comprising a fastener configured to extend through the first hook to be partly received between the first joining plate and the second flange.

5. The mulling system of claim 1, wherein, in the rotated and engaged arrangement, the first joining plate and the second joining plate overlap with the first thermal breaker overlapping second thermal breaker.

6. The mulling system of claim 5, wherein, in the rotated and engaged arrangement, the first thermal breaker defines a first width and the second thermal breaker defines a second width, the first width defined between the first plate member and the second plate member, the second width defined between the third plate member and the fourth plate member; and wherein the first joining plate overlaps the second joining plate along a majority of the first width of the first thermal breaker.

7. The mulling system of claim 1, wherein the first plate member, the second plate member, the third plate member, and the fourth plate member are made of a metallic material, and the first thermal breaker and the second thermal breaker have lower thermal conductivity than the first, second, third, and fourth plate members.

8. The mulling system of claim 1, wherein the first joining plate includes a first hook and a first flange disposed on opposite edges thereof;

wherein the second joining plate includes a second hook and a second flange disposed on opposite edges thereof;

wherein the first hook is configured to receive the second flange and the second hook is configured to receive the first flange to attach the first joining plate and the second joining plate; and wherein at least one of the first hook and the second hook includes a lip, the lip configured to support a covering member configured to extend between the first fenestration unit and the second fenestration unit to cover the lip.

9. The mulling system of claim 1, further comprising an end plug configured to be received between the first fenestration unit and the second fenestration unit at corresponding ends of the first joining plate and the second joining plate.

10. A mulling system for a plurality of fenestration units comprising:

a first joining plate that extends longitudinally along a mulling axis, the first joining plate configured to attach to a first outer edge of a first fenestration unit, the first joining plate including a first alignment fin configured to be received in a first groove of the first fenestration unit, the first joining plate including a first plate member, a second plate member, and a first thermal breaker that extend longitudinally along the mulling axis with the first thermal breaker attaching the first and second plate members;

a second joining plate that extends longitudinally along the mulling axis, the second joining plate configured to attach to a second outer edge of a second fenestration unit, the second joining plate including a second alignment fin configured to be received in a second groove of the second fenestration unit, the second joining plate including a third plate member, a fourth plate member, and a second thermal breaker that extend longitudinally along the mulling axis with the second thermal breaker attaching the third and fourth plate members;

the second joining plate configured to attach to the first joining plate in an engaged arrangement to join together the first fenestration unit and the second fenestration unit with the mulling axis extending between the first joining plate and the second joining plate;

wherein, in the engaged arrangement, the first joining plate and the second joining plate overlap with the first thermal breaker overlapping second thermal breaker, the first thermal breaker overlaps with the first alignment fin, and the second thermal breaker overlaps with the second alignment fin;

wherein the first thermal breaker aligns with the first alignment fin perpendicular to the mulling axis on one side thereof; and wherein the second thermal breaker aligns with the second alignment fin perpendicular to the mulling axis on an opposite side thereof.

* * * * *